Patented May 6, 1952

2,595,952

UNITED STATES PATENT OFFICE 2,595,952

POLYVINYL ACETATE EMULSION CONTAINING A POLYALKYLENE GLYCOL

Walter G. Kunze and Raymond Bertram Evans, Catonsville, Md., assignors to Le Page's Inc., Gloucester, Mass., a corporation of Massachusetts No Drawing. Application April 6, 1950, Serial No. 154,421

7 Claims. (Cl. 260—29.6)

This invention relates to emulsions of polymers which are suitable for use as coatings and as adhesives. It is particularly concerned with such an emulsion of polymers which is capable of providing a water-resistant bond or coating and which at the same time retains the stability, fluidity and the various other physical properties of such an emulsion which make it particularly useful as a coating or adhesive.

The use of melts and solutions of water insoluble artificial resins in the coating and adhesive art has been supplanted to a large extent by emulsions of such resins, particularly polyvinyl acetate emulsions, due to the improved ease, economy and safety with which aqueous emulsions of the resin may be employed. On the other hand, the usefulness of water insoluble polymer emulsions has been limited by the characteristic lack of water-resistance of the coatings and bonds deposited therefrom at room temperature and the tendency of such coatings and bonds to re-emulsify or disintegrate when subsequently brought into contact with water during the course or normal use of the object or article to which they have been applied.

This lack of water-resistance has been considered innate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause its redispersion when the surface is brought into contact with water.

Various proposals have been made to obviate the water-sensitivity of the coating or bond deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such as dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification effected by some of these substances did not result in a substantial improvement in the water-resistance of the coating or film deposited from the emulsion, and often imparted undesirable color and foaming characteristics to the emulsion.

Where thermo-plastic polymeric material has been employed, it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested is often impractical.

A further suggestion directed to retaining the advantages of working with the polymers in an aqueous medium and at the same time avoiding the inherent disadvantages of water-sensitivity of the coatings or films deposited therefrom required dispersing the polymer as extremely small particles. The coatings or films deposited from such emulsions do exhibit a satisfactory water-resistance but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small quantities of other monomers, which is stable throughout long periods of storage, and which when employed as a coating or as an adhesive will deposit a coating or bond which is highly water-resistant. A further object of the invention is to provide a process which is generally applicable to modify emulsions of polymers, particularly polyvinyl acetate, which have been polymerized to different extends, or in different manners, and which include various combinations of plasticizers and other diluents commonly employed to develop favored characteristics in the films or coating deposited from such emulsions.

We have discovered that the water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of one or more of a certain group of organic compounds within specific limits. These active compounds are charterized by a particular balance between the parts of the monomeric molecule, one part of which is hydrophilic or polar in nature, and the other part of which is hydrophobic or non-polar. The effectiveness of the compounds in producing water-resistance in the coatings or bonds deposited from such emulsions is apparently due to the presence of both the polar and non-polar groups within the molecule in the prescribed balance. As a class, these active compounds exhibit solubility, to various extents, in both water and in organic solvents such as mineral spirits, petroleum ether, toluene, castor oil, etc. This solubility in both water and organic solvents apparently is due to the dual hydrophilic-hydrophobic nature of the compound. As it has been generally recognized that the presence of water-soluble emulsifiers carried into the bonds and coatings deposited from emulsions of water-insoluble polymers may later cause redispersion and disintegration of the bonds and coatings, it was particularly surprising to find that incorporating into the emulsion additional compounds which are water-soluble themselves will nullify the effect of the water-soluble emulsifiers and thereby impart water-resistance to the coatings and films deposited from such emulsions.

For present purposes a polar or hydrophilic group or radical may be considered to be one which has a strong affinity for water and which when combined in compounds in which it is the dominant functional group will cause the resulting compound to be immiscible, or miscible to a limited extent, in oil-type solvents. A non-polar or hydrophobic group, on the other hand, may be considered to be one which has slight affinity for water and a strong affinity for oil-type solvents. In general, the hydroxyl group displays the characteristics of a suitable polar group. Within defined limits ether chains such as those present in the polyglycols may exhibit hydrophobic characteristics which will result in the desired water-resistance when a compound comprising such a chain combined with hydroxyl groups is employed with emulsions of polyvinyl acetate as hereinafter specified.

We have found that the polymeric glycols having a molecular weight of 134 inclusive to about 1,000 are generally active in producing water-resistance in the films or coatings deposited from polyvinyl acetate emulsion. The polymers of these compounds generally contain certain amounts of the monomeric material which is polymerized to different extents, so that the molecular weight specified refers to an average weight.

Ethylene glycol, diethylene glycol, and propylene glycol, having 2, 4 and 3 carbon atom chains, respectively, combined in their molecules with two hydroxyl groups are too hydrophilic to be generally effective with all types of polyvinyl acetate emulsion. It has been observed, however, that polymerization of the monomeric molecules will mask to a large extent the hydrophilic nature of these compounds, and the polymeric forms having a molecular weight of 134 and above are effective. The upper limit of molecular weight of these polymers at which the molecule is dominated by the non-polar residue, the ether chains, appears to be in the vicinity of about 1,000. It was noted, for example, that poly propylene glycol 1025 was not effective, whereas the polymer glycols having a lesser molecular weight were very active. It was observed in the case of the polyethylene glycols that polymerization to a molecular weight which marked the limit of activity as an active compound corresponded with the extent of polymerization at which the compound showed a marked reduction in water solubility. Apparently, the predominance of the polar residue at this point causes both effects.

Particularly good results were obtained with dipropylene-glycol, molecular weight 134, triethylene glycol, molecular weight 150, poly-propylene-glycol, molecular weight 450.

The preferred range of quantities of one or more of the active compounds by weight with respect to the solid content of the polyvinyl acetate emulsion has been found to be between about four to twenty-five per cent, the optimum amount in a particular instance depending upon the initial water-resistance characteristics of the starting material emulsion, the amount of plasticizers employed, the age of the starting material emulsion, and the rate at which the composition is formulated.

The physical properties of a polyvinyl acetate emulsion such as the viscosity of the emulsion, and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of active compounds is necessary to impart the desired water-resistance to the deposited coatings or bonds when the relatively greater water-resistant emulsions are employed as a starting material.

For present purposes the polyvinyl acetate starting material emulsions having sufficient tack to be useful as quick-setting adhesives may be classified in three groups according to their initial water-resistance although in each instance the water-resistance is negligible from the standpoint of minimum commercial requirements. Such emulsions generally contain about 50–60% polyvinyl acetate by weight, and a bond produced by the respective emulsions between two sheets of mildly calendered white sulphite paper will open up after 24 hours immersion in water at about 25° C.

Such polyvinyl acetate emulsions, which include the commercially available emulsions known as Elvacet No. 80–900, Elvacet 81–900, Gelva S–50, Polyco 117H, Polyco 289 and Polyco 117SS produce bonds which show practically no water-resistance on immersion.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the active compounds required to effect complete water-resistance.

The amounts of active compound required to produce maximum water-resistance in a particular emulsion also varies with the quantity and the nature of the plasticizers, extenders, or other diluents which may be used to develop desired characteristics of fluidity or tackiness in the emulsion, or of flexibility, hardness, etc. in the coating or film deposited from the emulsion. In general, it has been found that the insoluble type of plasticizers and resins in common use increase the effectiveness of the active compounds, and that a lesser quantity of active compound is necessary to produce complete water-resistance when such plasticizers are also present in the emulsion. It should be noted, however, that in each instance the emulsion containing the plasticizers and various other diluents was not initially water-resistant and that the addition of the active compound was necessary to effect any satisfactory water-resistance, although as related above, a lesser amount is necessary when insoluble plasticizers are also present.

This enhancing effect of the insoluble plasticizers was particularly observed with respect to dimethyl phthalate, dibutyl phthalate, chlorinated diphenyls, methyl abiatate and tributyl phosphate, and appears to be characteristic of other common plasticizers such as di-carbitol phthalate, dibutoxyglycol phthalate, dimethoxyglycol phthalate, butyl phthalyl glycolate, methyl phthalyl ethyl glycolate, triglycol di-2-ethylbutyrate, triglycol di-2-ethylhexoate, tricresyl phosphate and triphenyl phosphate.

On the other hand, the presence of a small amount of water-soluble thickeners such as polyvinyl alcohol and sodium carboxymethyl cellulose tend to increase the amount of active compound necessary to effect maximum water-resistance.

In some instances care must be exercised to avoid breaking the emulsion by sudden heating, or by extended heating above the temperature specified. The critical temperature will vary, of course, with the character of the particular starting material emulsion employed.

Aging the composition tends to increase the water-resistance of the coatings or films deposited therefrom.

It will be apparent from the foregoing that innumerable possibilities for formulating the instant water-resistance composition exist, and that the invention may be practiced to increase the water-resistance of any particular polyvinyl acetate emulsion without materially interfering with the versatility of the starting material emulsion. It will be noted, however, that any of the active compounds having the requisite polar-nonpolar balances in the molecules thereof are effective in producing water-resistance when used in quantities within the range of 4–25% by weight of the solids present in the starting material polyvinyl acetate emulsion.

The minimum amount of a particular one of the active compounds depends upon the factors previously discussed, but in all instances is within the range referred to above. Compositions having up to 50% by weight of active compounds with respect to the solid content of the starting emulsion may be employed, especially where the active compound has plasticizing properties which are desirable and the cost of the compound is not prohibitive. In most instances, however, the maximum water-resistance is obtained with the least effect on other physical characteristics of the composition when a total of from 12–17% of active compound or compounds by weight of solids in the starting material emulsion are employed. It has been found that the effectiveness of a given amount of active compound can be enhanced by diluting the composition with water to reduce the solid content thereof to between 40–50% after the active compound has been thoroughly mixed with the starting material emulsion. Some of the numerous possibilities which exist in formulating a water-resistant composition within the operable limitations specified above are illustrated in the following examples.

The addition of the active compound to the starting material emulsion may result in a substantial increase in the viscosity of the emulsion to form a cohesive mass unless the active compound is added slowly with continuous agitation. In some instances rapid addition of the active compound results in localized precipitation of the emulsion. The largest part of the increased cohesiveness and viscosity of the emulsion caused by addition of the active compound at a suitable rate disappears on agitation, or when the treated emulsion is permitted to stand for a short period following the addition of the active compound.

In all of the following examples the composition was prepared by stirring the starting material emulsion with a high-speed mixer continuously during the addition of the active compound thereto. The active compound was introduced into the emulsion at the rate of about 3% of the total weight of the active compound per minute. The formulation can be carried out at normal ambient temperatures.

Each of the tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with an active compound was considered fully indicated when the strength of the bond exceeded the wet strength of the paper after 24 hours immersion.

It will be understood that the films and bonds deposited from emulsions of the type here dealt with comprise the materials found in the emulsions with the exception of the external water phase which evaporates upon drying of the films and bonds.

*Example 1*

A first sample was prepared by placing 110 grams of a tacky polyvinyl acetate emulsion having about 55% solid content in a container and stirring it continuously with a high-speed mixer. 25 grams of a rosin emulsion extender (Dresinol 42) and 6 grams of dimethyl phthalate plasticizer were added to the emulsion and the stirring continued. 2.5 grams of dipropylene glycol were added slowly to this mixture and the stirring continued until a homogeneous mass was obtained.

Four additional samples were similarly prepared using, respectively, 3.5 grams, 5 grams, 6 grams and 9 grams of dipropylene glycol in place of the 2.5 grams thereof used in preparing the first sample.

The waterproofness of each sample was tested by applying it as a film and bound to a mildly calendered and sized white sulphite paper. The films and bonds were thereafter allowed to dry for 24 hours. They were then immersed in water at room temperature for about 24 hours. The films remained continuous and intact. The bonds exceeded the wet strength of the paper and remained unbroken when the bonded papers were separated.

5 additional samples were prepared using the same amounts of starting material emulsion and dipropylene glycol but omitting the extender and plasticizer. These samples were tested in the manner described above and were also found to be waterproof.

*Example 2*

A composition was prepared by placing 110 grams of a tacky polyvinyl acetate emulsion having about 55% solid content in a container and stirring this continuously while adding 15% by weight of the solid content of the emulsion of polypropylene glycol 1025. A second sample was prepared in the same manner and 10 grams of a dimethyl phthalate plasticizer was added to the second sample. Both samples were tested for waterproofness in the manner described in Example 1. In each instance the film and bond had disintegrated after 24 hours immersion. The wet strength of the paper exceeded the strength of the bonds deposited from these samples and the bond was broken when the bonded papers were separated.

*Example 3*

110 grams of a tacky polyvinyl acetate emulsion having about 55% solid content was placed in a mixing container and stirred with a high-speed mixer. 12 grams of polypropylene glycol 425 and 10 grams of a dibutyl phthalate plasticizer were added to this starting material emulsion. The stirring was continued until a homogeneous mass was obtained. A second sample was similarly prepared using 28 grams of polypropylene glycol 425 in place of the 12 grams mentioned above. A third sample was formulated by adding 15 grams of polyethylene glycol 425 to 110 grams of the same starting material emulsion.

All these samples were tested for waterproofness in the manner described and found to be waterproof.

*Example 4*

110 grams of a tacky polyvinyl acetate having a solid content of about 55% was placed in a container and stirred continuously with a high-speed mixer. 6 grams of a dimethyl phthalate plasticizer and 5 grams of polyethylene glycol 400 were added slowly to the starting material emulsion. Thereafter the emulsion was diluted with water to bring the solid content thereof to about 40% by weight of the emulsion. A second and third sample were prepared in the same manner using, respectively, 6 and 15 grams of polyethylene glycol 400 in place of the three grams thereof used in the first sample. The waterproofness of the films and bonds deposited from all these samples was tested in the manner described in Example 1, and all were found to be waterproof.

Three additional samples were prepared in the same manner as those referred to above with the exception that the dilution of the emulsion was omitted. These samples were similarly tested and were also found to deposit waterproof films and bonds

*Example 5*

Two samples were prepared by adding, respectively, 15 grams and 25 grams of triethylene glycol to a tacky polyvinyl emulsion having a solid content of about 55%. The starting material emulsion was stirred continuously during this addition. Both samples were tested for waterproofness in the manner described in Example 1 and were found to deposit waterproof films and bonds.

*Example 6*

Five samples were prepared by adding, respectively, 5, 10, 15, 20 and 25 grams of diethylene glycol to 110 grams of a tacky polyvinyl acetate emulsion having a solid content of about 55%. The addition of the diethylene glycol was made slowly while the starting material emulsion was stirred constantly with a high-speed mixer. Five additional samples were prepared in the same manner and to each of these was added 6 grams of a dimethyl phthalate plasticizer. All ten samples were tested for waterproofness in the manner described in Example 1. In each instance the films and bonds deposited therefrom had disintegrated after the 24 hour immersion in water. None of the samples deposited waterproof films and bonds.

It will be apparent that the water-repellent compositions formulated according to the instant invention will considerably extend the usefulness of aqueous emulsions of polyvinyl acetate into the field in which high water-resistance of the bond or coating deposited is necessary and will find application in bonding or cementing for cellulosic articles such as paper cups which in the course of normal use are exposed to water and for bonding surfaces of cellulosic material to other surfaces of a hydrophilic character such as masonry. These compositions are particularly adapted for use as a sizing where water-resistance of the fabric or the paper to which it is applied is required. It may also be employed in the composition of printing paste, as a finish for paper, paper-board, or foils and in the manufacture of formed or impregnated goods, as well as in distemper paints and the like.

Having thus described the invention, what is new and desired to be secured by Letters Patent is:

1. A composition comprising a tacky aqueous emulsion of polyvinyl acetate and 4 to 50% by weight of said acetate of an unsubstituted polyalkylene glycol having a molecular weight of 134 to 1000.

2. A composition comprising a tacky aqueous emulsion of polyvinyl acetate, a plasticizer for said acetate, and from 4 to 50% by weight of said acetate of an unsubstituted polyalkylene glycol having a molecular weight of 134 to 1000.

3. A composition comprising a tacky aqueous emulsion of polyvinyl acetate, and from 4 to 50% by weight of said acetate of a polymeric ethylene glycol having a molecular weight of 150 to 1000.

4. A composition comprising a tacky aqueous emulsion of polyvyinl acetate, and from 4 to 25% by weight of said acetate of triethylene glycol.

5. A composition comprising a tacky aqueous emulsion of polyvinyl acetate, and from 4 to 25% by weight of said acetate of a polymeric propylene glycol having a molecular weight of 134 to 1000.

6. A composition comprising a tacky aqueous emulsion of polyvinyl acetate, and from 4 to 25% by weight of said acetate of di-propylene glycol.

7. A composition comprising polyvinyl acetate and from 4 to 50% by weight of said acetate of an unsubstituted polyalkylene glycol having a molecular weight of 134 to 1000.

WALTER G. KUNZE.
RAYMOND BERTRAM EVANS.

REFERENCES CITED

The following references are of record in the file of this patent:

UNITED STATES PATENTS

| Number | Name | Date |
|---|---|---|
| 2,300,074 | Strain | Oct. 27, 1942 |
| 2,444,396 | Collins et al. | June 29, 1948 |

OTHER REFERENCES

"Vinylite Resins," published 1942 by Carbide and Carbon Chemicals Corp., page 4.

"Synthetic Organic Chemicals," 12th edition, by Carbide and Carbon Chemicals Corporation, 1946, pages 20–21.